(12) United States Patent
Riocreux (10) Patent No.: US 8,601,167 B2
(45) Date of Patent: Dec. 3, 2013

(54) MAINTAINING REQUIRED ORDERING OF TRANSACTION REQUESTS IN INTERCONNECTS USING BARRIERS AND HAZARD CHECKS

(75) Inventor: Peter Andrew Riocreux, Cheadle (GB)

(73) Assignee: ARM Limited, Cambridge (GB)

( * ) Notice: Subject to any disclaimer, the term of this patent is extended or adjusted under 35 U.S.C. 154(b) by 442 days.

(21) Appl. No.: 12/923,907

(22) Filed: Oct. 13, 2010

(65) Prior Publication Data

US 2011/0093557 A1    Apr. 21, 2011

(30) Foreign Application Priority Data

| Oct. 13, 2009 | (GB) | 0917946.6 |
| Apr. 30, 2010 | (GB) | 1007342.7 |
| Apr. 30, 2010 | (GB) | 1007363.3 |
| Oct. 1, 2010 | (GB) | 1016482.0 |

(51) Int. Cl.
*G06F 3/00* (2006.01)

(52) U.S. Cl.
USPC .................................. 710/1; 710/15; 710/19

(58) Field of Classification Search
None
See application file for complete search history.

(56) References Cited

U.S. PATENT DOCUMENTS

| 5,675,579 A | 10/1997 | Watson et al. |
| 6,038,646 A | 3/2000 | Sproull |
| 6,748,518 B1 | 6/2004 | Guthrie et al. |
| 6,967,926 B1 | 11/2005 | Williams et al. |
| 2006/0218335 A1 | 9/2006 | Hofmann et al. |
| 2007/0250668 A1 | 10/2007 | Arimilli et al. |
| 2008/0168191 A1* | 7/2008 | Biran et al. ............... 710/23 |
| 2008/0301342 A1* | 12/2008 | Hofmann et al. ......... 710/105 |

FOREIGN PATENT DOCUMENTS

| EP | 1 594 061 | 11/2005 |
| EP | 2 015 167 | 1/2009 |
| WO | WO 2006/102667 | 9/2006 |

OTHER PUBLICATIONS

Search Report for UK 0917946.6 dated Jan. 22, 2010.
Search Report for UK 1007363.3 dated Aug. 23, 2010.
Search Report for UK 1007342.7 dated Aug. 20, 2010.

* cited by examiner

*Primary Examiner* — Zachary K Huson
(74) *Attorney, Agent, or Firm* — Nixon & Vanderhye P.C.

(57) ABSTRACT

Interconnect circuitry is configured to provide data routes via which at least one initiator device may access at least one recipient device and includes at least one input for receiving transaction requests from said at least one initiator device; at least one output for outputting transaction requests to the recipient device; at least one path for transmitting the transaction requests between the input and the output; and control circuitry for routing the received transaction requests from the input to the output, wherein the control circuitry is configured to maintain an ordering of at least some transaction requests with respect to the barrier transaction request within a stream of transaction requests passing along one of the paths, by not allowing reordering of at least some of the transactions requests that occur before the barrier transaction request in the stream of transaction requests.

15 Claims, 4 Drawing Sheets

MAINTAINING REQUIRED ORDERING OF TRANSACTION REQUESTS IN INTERCONNECTS USING BARRIERS AND HAZARD CHECKS

This application claims priority to UK Patent Application Nos. 0917946.6 filed 13 Oct. 2009, 1007342.7 filed 30 Apr. 2010, 1007363.3 filed 30 Apr. 2010 and 1016482.0 filed 1 Oct. 2010, the entire contents of each of which are hereby incorporated by reference.

BACKGROUND OF THE INVENTION

1. Field of the Invention

This invention relates to the field of data processing systems. More particularly the invention relates to interconnect circuitry for data processing apparatus, the interconnect circuitry providing data routes via which one or more initiator devices such as a master may access one or more recipient devices such as a slave.

2. Background

Interconnects are used to provide connections between different components in data processing systems. They provide data routes via which one or more initiator devices may access one or more recipient device. An initiator device is simply a device that generates a transaction request, and therefore may be a master such as a processor or it may be another interconnect. A recipient device is simply a device that receives the transactions and it may be a slave such as a peripheral or it may also be another interconnect.

As systems become more complex with multiple processors communicating with each other and multiple devices, authors writing software for multiprocessor systems need detailed knowledge of the topology and latency of an architecture, in order to write software which ensures consistent behaviour of interacting processes across time. Even with this detailed knowledge this consistency is only achieved with some non-trivial effort and cost to performance.

It would be desirable to provide mechanisms that allowed a programmer to ensure consistent behaviour of interacting processes across time in a generic manner for an arbitrary architecture.

Barriers have been used for this purpose in co-pending US application for "Reduced Latency Barrier Transaction Requests in Interconnects" the entire contents of which is incorporated herein by reference. Barriers provide an effective way of maintaining an order between certain transaction requests within a transaction request stream. They do this by either not allowing the transaction requests that they control to overtake them or by blocking these transaction requests at an upstream point. Although this is an effective way of maintaining the order it does increase the latency of the system and requires control circuitry to control the barrier behaviour. It would be desirable to control the ordering of transactions without unduly increasing latency.

SUMMARY OF THE INVENTION

A first aspect of the present invention provides interconnect circuitry for a data processing apparatus, said interconnect circuitry being configured to provide data routes via which at least one initiator device may access at least one recipient device, said interconnect circuitry comprising: at least one input for receiving transaction requests from said at least one initiator device; at least one output for outputting transaction requests to said at least one recipient device; at least one path for transmitting said transaction requests between said at least one input and said at least one output; control circuitry for routing said received transaction requests from said at least one input to said at least one output; wherein said control circuitry is configured to maintain an ordering of at least some transaction requests with respect to said barrier transaction request within a stream of transaction requests passing along one of said at least one paths, by not allowing reordering of at least some of said transactions requests that occur before said bather transaction request in said stream of transaction requests with respect to at least some of said transaction requests that occur after said barrier transaction request in said stream of transaction requests; hazard checking circuitry for checking a stream of transaction requests and comparing a transaction request within said stream of transaction requests against earlier outstanding transaction requests that have not yet completed, to determine if said transaction request may potentially generate a data hazard, and in response to detecting a potential hazard between said transaction request and at least one of said outstanding transaction requests said hazard checking circuitry is configured to stall said transaction request until said at least one outstanding transaction request has completed; and barrier termination circuitry associated with said hazard checking circuitry for detecting a barrier transaction request within said stream of transaction requests and terminating said bather transaction request.

The present invention recognises that in interconnect circuitry where there is a provision to hazard check for data hazards in a stream of transaction requests by comparing a received transaction request with previously received outstanding transaction requests that have not yet completed then this check will provide a same function as a barrier transaction request in that it will prevent observable reordering of transactions. That is a reordering of transactions that can be observed, i.e. the order that the transactions are performed in will affect the result. The present invention therefore provides barrier termination circuitry associated with such hazard checking devices and any barriers detected are terminated. In this way the overheads of the barriers are avoided in situations where it is recognised that they are not required.

In some embodiments, said barrier termination circuitry comprises a response signal generator for generating a response signal to be transmitted to a source of said barrier transaction request.

As noted earlier, there are different types of barriers, non-blocking barriers that sit in the stream of transaction requests and do not allow transaction requests that they control to go past them in either direction, and blocking barriers that is barriers that block subsequent transactions that they control at a particular point upstream. A blocking barrier can allow subsequent transaction requests to overtake it as none of these will be transaction requests controlled by the barrier as these will already have been blocked. The block remains active until a response signal is received. Thus, where a barrier is terminated by the barrier termination circuitry, there is also a response signal generator for embodiments that have blocking barriers and this response signal generator will generate a response to the barrier transaction request where it detects that one is required.

In some embodiments, said hazard checker is responsive to detection of a barrier transaction request within said stream of transaction requests to mark all of said outstanding transaction requests and to only compare subsequent transaction requests with marked outstanding transaction requests.

The present invention recognises that although hazard checkers provide an effective way of avoiding data hazards they are costly in power as each received transaction request must be compared against all outstanding transaction requests. However, the present invention also recognises that for the removal of a barrier one simply needs to verify that any transaction requests prior to the barrier do not conflict with those subsequent to the barrier. Thus, only those prior to the barrier need to be checked against those subsequent to the barrier. Thus, if the ones prior to the barrier transaction requests are marked and any newly received transaction requests after the barrier are not marked, then only the marked transactions need to be compared against newly received transaction requests. In this way, as the earlier transaction requests complete a lower and lower number of transaction requests need to be compared and the amount of power and time taken for these comparisons is similarly reduced.

In some embodiments, said hazard checker is responsive to detecting that all of said marked outstanding transaction requests have completed to no longer compare transaction requests with outstanding transaction requests until receipt of a subsequent barrier transaction request.

Having recognised that only transactions prior to the barrier need to be compared with those after the barrier for barrier removal then once all of the marked outstanding transaction requests (which are those prior to the barrier transaction requests) have completed there is no longer any need to compare transaction requests received with outstanding transaction requests until a subsequent barrier is received. In this way the comparator can be powered down and power can be saved. It should be noted that outstanding transaction requests that have not completed must still be tracked by the hazard checker as if a new barrier is received then these will be marked and it will be these transaction requests that are compared to the transaction requests subsequent to the barrier.

In some embodiments, said interconnect comprises two routes between two points in said interconnect circuitry, a first of said two routes transmitting transaction requests faster than a second of said two routes, said second of said two routes comprising said hazard checker for checking a stream of transaction requests passing along said second of said two routes, said control circuitry being responsive to detecting that all of said marked transaction requests have completed to route said stream of transaction requests via said first route.

Recognition of the fact that for some of the time the hazard checker does not need to compare transaction requests with outstanding transaction requests can be used to improve the efficiency of the interconnect by providing two data routes, one with the hazard checker and comparator on it and one without. The one without the hazard checker is the faster route and thus, when hazard checking is not required the transaction requests can be sent along this faster route and latency and power consumption are reduced. When a next barrier transaction request is received then the transaction requests are once again routed along the slower route, until all marked transaction requests have again completed.

In some embodiments, said hazard checker comprises a data store for storing data identifying said outstanding transaction requests and an indicator associated with each outstanding transaction request, and said hazard checker is responsive to detection of a barrier transaction request within said stream of transaction requests to mark all of said outstanding transaction requests by setting said indicator for all of said outstanding transaction requests and to only compare subsequent transaction requests with marked outstanding transaction requests.

Tracking of outstanding transaction requests can be performed using a data store for storing data identifying these outstanding transaction requests. This data store can also have an indicator value associated with it, the indicator value being set to indicate that the transaction request is one received before a barrier transaction request. Marking the transaction request in this way is an elegant way of enabling the hazard checker to know which transaction requests it needs to compare newly received transaction requests against.

In some embodiments, said hazard checker comprises a comparator for comparing at least a portion of an address of said transaction request with a corresponding portion of an address of said outstanding transaction requests and in response to a match detecting said potential data hazard.

Although the hazard checker can identify a potential data hazard by comparing a number of things, in some embodiments it is a portion of the address that it compares. This portion may be the whole address or it can be simply a small portion. The smaller the portion the less energy and latency associated with the comparison but the less accurate the result as well. A lower accuracy result provides a greater potential for more transaction requests to be unnecessarily stalled.

A second aspect of the present invention provides a method of routing transaction requests from at least one initiator device to at least one recipient device via interconnect circuitry comprising: receiving transaction requests from said at least one initiator device; routing said transaction requests along at least one path between at least one input to said interconnect circuitry and at least one output; maintaining an ordering of at least some transaction requests with respect to bather transaction requests within a stream of transaction requests passing along one of said at least one paths, by not allowing reordering of at least some of said transactions requests that occur before said barrier transaction request in said stream of transaction requests with respect to at least some of said transaction requests that occur after said barrier transaction request in said stream of transaction requests; detecting transaction requests within said stream of transaction requests: and in response to said transaction request being a barrier transaction request terminating said barrier transaction request; and in response to said transaction request not being a barrier transaction request comparing said transaction request against outstanding transaction requests that have not yet completed and are in front of said transaction request in said stream of transaction requests, to determine if said transaction request may potentially generate a data hazard; and in response to detecting a potential hazard between said transaction request and at least one of said outstanding transaction requests stalling said transaction request until said at least one outstanding transaction request has completed.

A third aspect of the present invention provides interconnect means for providing data routes via which at least one initiator device may access at least one recipient device within a data processing apparatus, said interconnect means comprising: at least one input means for receiving transaction requests from said at least one initiator device; at least one output means for outputting transaction requests to said at least one recipient device; at least one routing means for transmitting said transaction requests between said at least one input means and said at least one output means; control means for routing said received transaction requests from said at least one input means to said at least one output means; wherein said control means is for maintaining an ordering of at least some transaction requests with respect to said bather transaction request within a stream of transaction requests passing along one of said at least one routing means, by not allowing reordering of at least some of said transactions requests that occur before said barrier transaction request in said stream of transaction requests with respect to at least some of said transaction requests that occur after said barrier transaction request in said stream of transaction requests; hazard checking means for checking a stream of transaction requests and comparing a transaction request within said stream of transaction requests against earlier outstanding transaction requests that have not yet completed, to determine if said transaction request may potentially generate a data hazard, and in response to detecting a potential hazard between said transaction request and at least one of said outstanding transaction requests said hazard checking means is configured to stall said transaction request until said at least one outstanding transaction request has completed; and barrier termination means associated with said hazard checking circuitry for detecting a barrier transaction request within said stream of transaction requests and terminating said barrier transaction request.

The above, and other objects, features and advantages of this invention will be apparent from the following detailed description of illustrative embodiments which is to be read in connection with the accompanying drawings.

DESCRIPTION OF THE PREFERRED EMBODIMENTS

Figure 1:
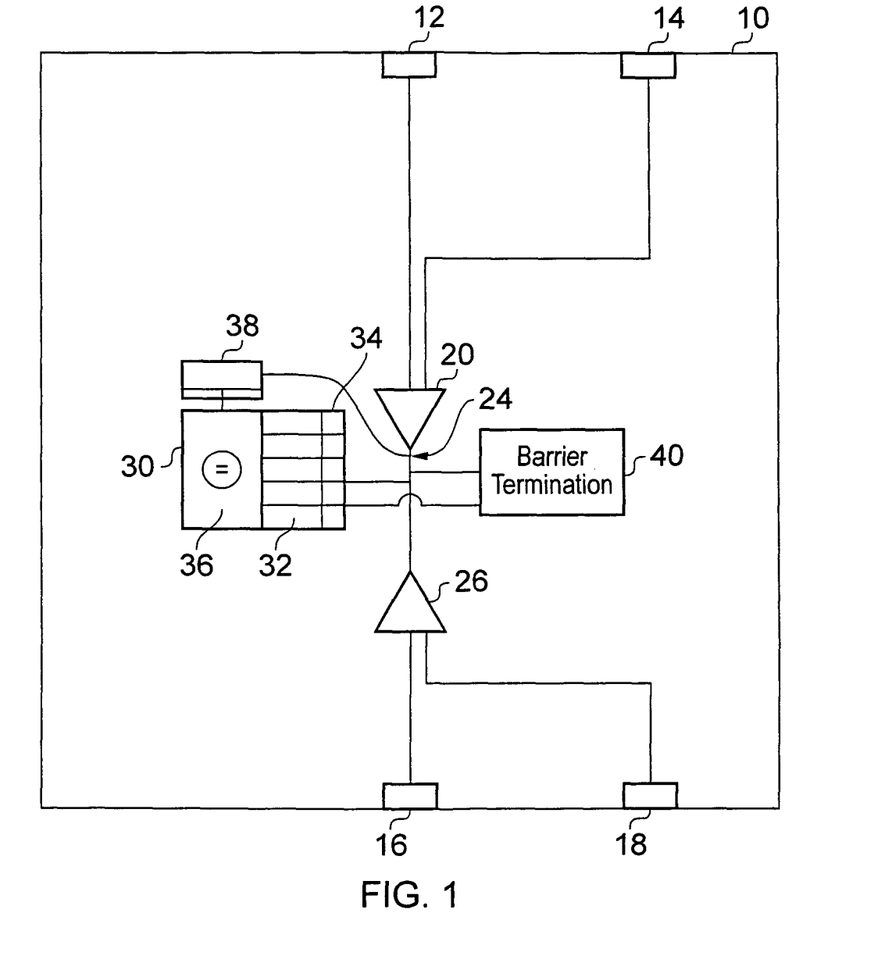
FIG. 1 shows interconnect circuitry with a hazard checker and barrier termination unit according to an embodiment of the present invention.

FIG. 1 shows interconnect circuitry 10 having input ports 12 and 14 for receiving transaction requests from initiator devices and output ports 16 and 18 for transmitting the transaction requests to a recipient device. Although, in this embodiment only a few paths and a few ports are shown it will be clear to a skilled person that the system could be far more complex with many more paths and ports, however for the sake of simplicity and clarity of illustration only a few illustrative paths are shown here.

Interconnect circuitry 10 has paths from input ports 12 and 14 and these meet at a merge point 20. Subsequent to this merge point there is a hazard checking unit 30 that checks transaction requests within the steam of transaction requests flowing along paths 24 between the merge point 20 and the subsequent point of divergence 26. Hazard checker 30 looks at each transaction request that passes along this path and in response to detecting a barrier it terminates the barrier using barrier termination unit 40 and if the barrier was a blocking barrier that had blocked subsequent transactions at an upstream location it will send a response to the barrier which will clear this block and allow the subsequent transactions to proceed.

Additionally in response to the barrier the hazard checker 30 will mark all the stored outstanding transaction requests within store 32 with a marker bit 34. Comparator 36 within hazard checker 30 then compares any received transaction requests with the stored transaction requests that are marked and in response to a match it stalls the transaction request. It may do this by simply not allowing it to proceed further along path 24 thereby holding up all the transaction requests behind it or it may have a separate store 38 where it holds the stalled transaction request until the outstanding transaction request that it matched has completed.

The data store 32 stores transaction requests within the transaction stream that have passed the merge point 20 but are still outstanding in that they have not yet completed and no acknowledge signal has been received along path 24 from the recipient device. Once an acknowledge signal is received to a transaction request then the data identifying this transaction request within data store 32 is deleted.

The data identifying the transaction requests is in some embodiments a portion of the address that the transaction request was routed to and it is a corresponding portion of the address of received transaction requests that this is compared with and in response to an address portion match the received transaction request being stalled. It should be noted that the portion of the address may be the whole address in which case the comparison is a comparison of many bits and requires significant time and power to perform but is completely accurate with no false positives. It may alternatively be a comparison of smaller portions of the address which may generate false positives and therefore more transaction requests that are stalled but can be accomplished with lower latency and less power In this embodiment, detection of a barrier results in the outstanding transaction requests within data store 32 being marked with indicator bit 34. This is in recognition of the fact that transaction requests subsequent to a barrier must be ordered with respect to transaction requests that occur before the barrier in the transaction stream but not with respect to other transactions. Thus, when the barrier has been removed hazard checks must be performed between transaction requests subsequent to the barrier and those prior to the barrier but not between different transaction requests that are subsequent to the barrier. Thus, marking those transaction requests that have been received and are pending when you receive a barrier means that the number of transaction requests that you need to compare with received transaction requests gradually decreases as the marked transaction requests complete and new transaction requests received are not marked. If a new barrier is received when there are still some stored marked transaction requests this is not a problem as all of the stored pending transaction requests are simply marked in this case.

Providing a marking mechanism reduces the number of comparisons that are required and improves performance. However, if this mechanism were not used the system would still function correctly and the barrier could be terminated. However in this case transaction requests received always would need to be compared with all stored pending transaction requests and this number would not decrease as occurs with the marking scheme.

A further advantage of marking the barrier transaction requests is that if the hazard checker 30 determines that there are no marks within data store 32 then it need no longer perform the comparison using comparator circuitry 36 and thus, time and power can be saved. It should be noted that although it may no longer perform the comparison it will need to store any outstanding transaction requests until they have completed as when a new barrier transaction request is received any outstanding transaction requests must be marked and thus, they must be present within the store 32.

Figure 2A:
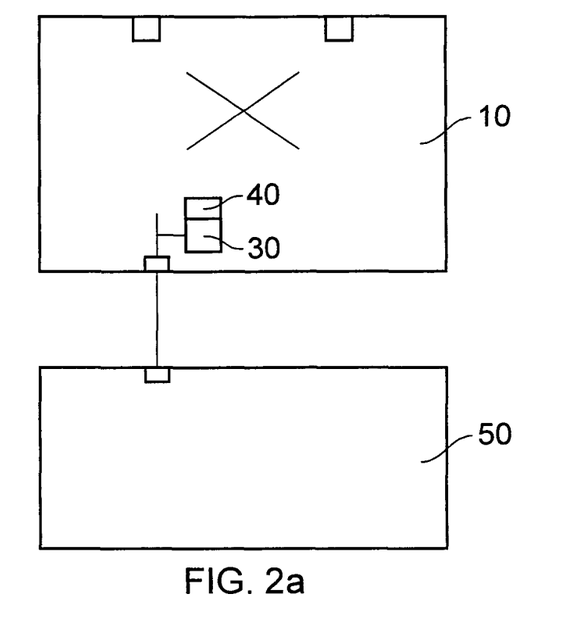
FIG. 2a interconnect circuitry comprising a hazard checker and barrier termination unit according to an embodiment of the present invention.

FIG. 2a shows very schematically an advantageous use of hazard checker 30 and associated barrier termination unit 40 according to an embodiment of the present invention. In this embodiment, interconnect 10 supports barrier transactions and can maintain the order of transaction requests passing through the interconnects in response to these barrier transaction requests. However, interconnect circuitry is connected to further interconnect circuitry 50 and interconnect circuitry 50 is not configured to support barrier transaction requests. Thus, before transaction requests are transmitted to interconnect circuitry 50 any barrier transaction requests within the transaction request stream should be removed. In such a case, the use of hazard checker 30 in association with barrier termination unit 40 provides a means of terminating the barriers and allows interconnect circuitry 40 to be connected to interconnect circuitry 50 and the system will still function correctly.

Figure 2B:
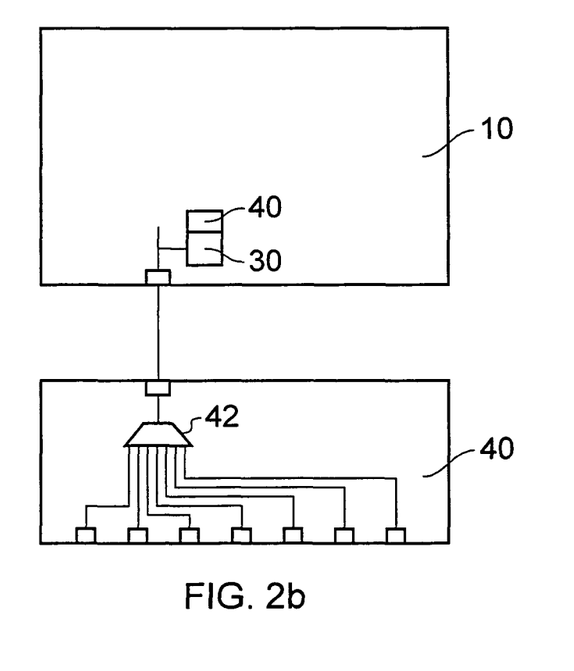
FIG. 2b shows an alternative embodiment of interconnect circuitry with a hazard checker and barrier termination unit.

FIG. 2*b* shows an alternative embodiment of the present invention where the use of barrier termination unit 40 with hazard checker 30 is also advantageous. In a similar way to FIG. 2*a* interconnect circuitry 10 is connected to a further interconnect circuitry 40. Interconnect circuitry 40 has many paths to many recipient devices and a point of divergence 42 at which these paths split. Many of these recipient devices are slow and thus, transmitting transaction requests along paths to the recipient devices is a slow process. It is therefore advantageous if barrier transaction requests are not sent down these paths particularly if they are blocking barrier transaction requests as the delay until a response signal is received if the response signal is received from the recipient device will be considerable. Thus, in such a configuration it is extremely advantageous if the barrier can be terminated before interconnect 40 and response signals sent to clear any upstream blockage. The use of a hazard checker in association with a barrier termination unit enables this barrier elimination to be performed.

Figure 3:
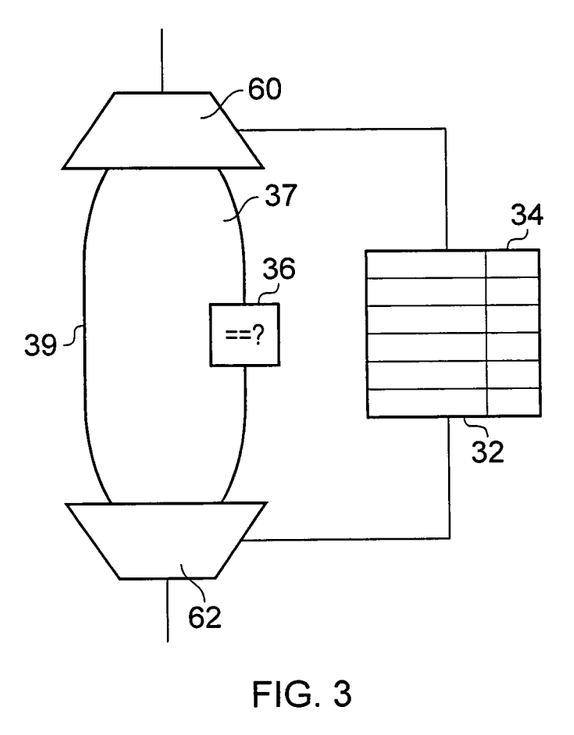
FIG. 3 shows a portion of interconnect circuitry with two alternative paths between the same points.

FIG. 3 shows a portion of an interconnect showing a further advantageous use of hazard checker 30 according to an embodiment of the present invention. In this embodiment, the comparator circuitry 36 is within one path that transaction requests are sent along and there is an alternative path 39 that transaction requests can be sent along. There is a multiplexer 60 at the point of divergence which selects which of the paths 39 or 37 the transaction requests are to be sent along and there is a subsequent multiplexer 62 where the two paths merge to become one path again. Data store 32 stores a record of any uncompleted outstanding transaction along with a mark 34 indicating whether they precede a received barrier or not. This data store is used as a select signal for multiplexer 60 and multiplexer 62. Thus, in response to there being no marks against entries in data store 32 fast path 39 is chosen and the transaction requests are not passed through comparator 36 but can proceed without undue delay to multiplexer 62 where they proceed on their way. However, once a barrier has been received and the marks are set in data store 34 then the select signal to multiplexer 60 changes and the transaction requests are sent down path 37 via comparator 36. As long as there is a marked outstanding transaction request within data store 32 the transaction requests continue to be sent down this slower path via comparator 36 and any match in the comparison results in the transaction request being stalled until the outstanding transaction request that it provided a match with has completed.

It should be noted with regard to the matching of transaction requests that addresses or at least portions of addresses can be used to provide this match. Furthermore, although accesses to the same address in the wrong order may cause a hazard they may not as this is dependent on the type of access. Thus, the comparator may also compare the type of transaction in addition to the address. Thus, a write transaction with the same address as an outstanding read transaction would trigger the hazard checker to signal a potential data hazard as would two writes and a read with an outstanding write.

Figure 4:
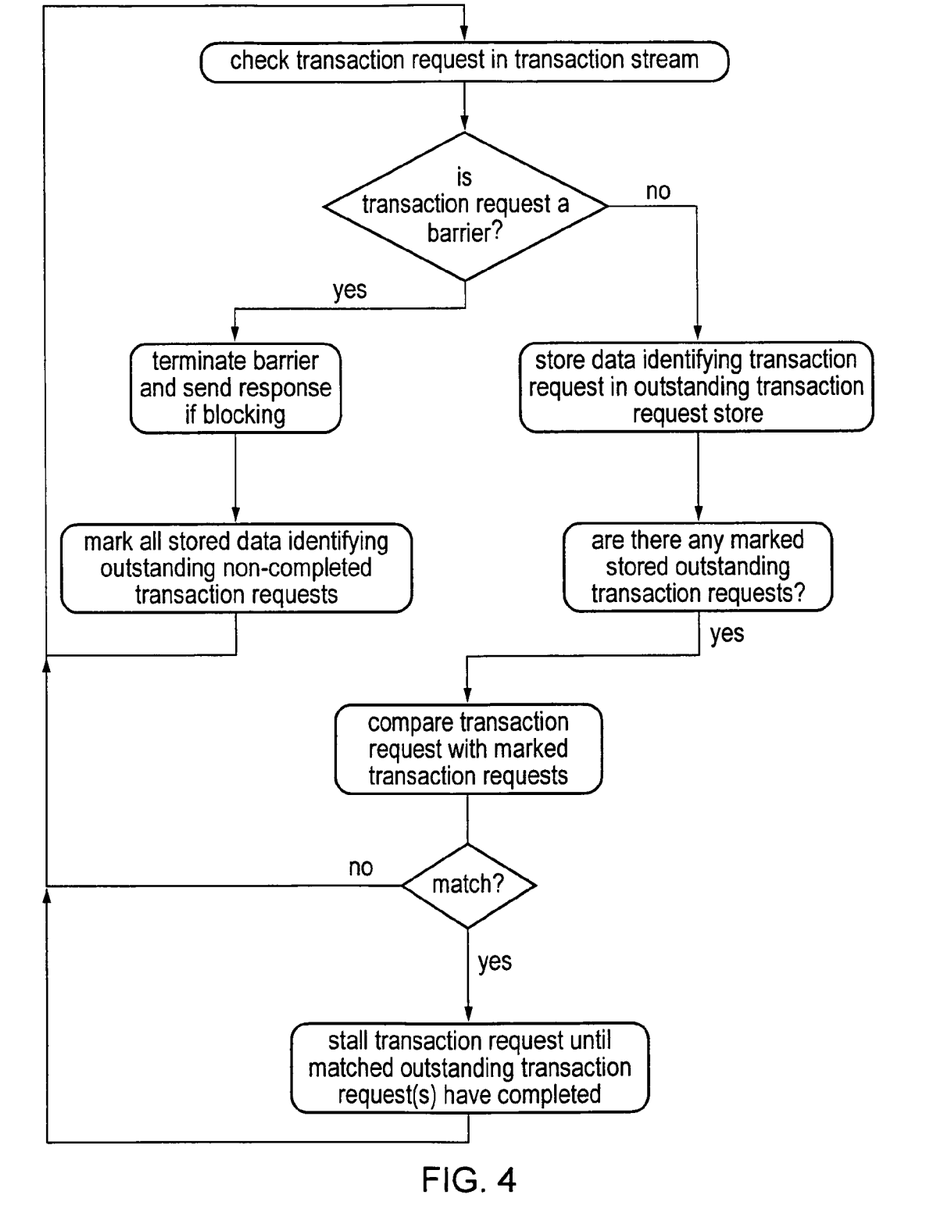
FIG. 4 shows a flow diagram illustrating a method according to an embodiment of the present invention.

FIG. 4 shows a flow diagram illustrating steps in a method according to an embodiment of the present invention. Transaction requests in a transaction stream are checked and it is determined if the transaction request is a barrier. If it is the barrier is terminated and a response may be sent to it if the barrier was a blocking barrier. All the stored data identifying outstanding non-completed transaction requests are then marked. If the transaction request was not a barrier transaction request then data identifying this transaction request is stored in the outstanding transaction request store and it is determined if there are any marks stored against any outstanding transaction request. If there are then these marked transaction requests are compared with the received transaction request to determine if there is a match. If there is a match then the transaction request is stalled until the matched outstanding transaction request(s) have completed.

If there is no match then the method proceeds to check the next transaction request in the transaction stream. Similarly, once the stalled transaction request has been allowed to proceed after the matched outstanding transaction requests have completed then again the next transaction request in the transaction stream is checked.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims. For example, various combinations of the features of the following dependent claims could be made with the features of the independent claims without departing from the scope of the present invention.

I claim:

1. Interconnect circuitry for a data processing apparatus, said interconnect circuitry configured to provide data routes by which at least one initiator device may access at least one recipient device, said interconnect circuitry comprising:

at least one input for receiving transaction requests from said at least one initiator device;

at least one output for outputting said transaction requests to said at least one recipient device;

at least one path for transmitting said transaction requests between said at least one input and said at least one output;

control circuitry configured to route said received transaction requests from said at least one input to said at least one output, wherein said control circuitry is configured to maintain an ordering of at least some transaction requests with respect to said barrier transaction request within a stream of transaction requests passing along one of said at least one paths, by not allowing reordering of at least some of said transactions requests that occur before said barrier transaction request in said stream of transaction requests with respect to at least some of said transaction requests that occur after said barrier transaction request in said stream of transaction requests;

hazard checking circuitry configured to check a stream of transaction requests and comparing a transaction request within said stream of transaction requests against earlier outstanding transaction requests that have not yet completed, to determine if said transaction request may potentially generate a data hazard, and, in response to detecting a potential hazard between said transaction request and at least one of said outstanding transaction requests, said hazard checking circuitry is configured to stall said transaction request until said at least one outstanding transaction request has completed; and barrier termination circuitry associated with said hazard checking circuitry and configured to detect a barrier transaction request within said stream of transaction requests and, only in response to detecting said barrier transaction request, to terminate said detected barrier transaction request.

2. Interconnect circuitry according to claim 1, wherein said barrier termination circuitry comprises a response signal generator for generating a response signal to be transmitted to a source of said barrier transaction request.

3. Interconnect circuitry according to claim 1, wherein said hazard checker is responsive to detection of a barrier transaction request within said stream of transaction requests to mark all of said outstanding transaction requests and to only compare subsequent transaction requests with marked outstanding transaction requests.

4. Interconnect circuitry according to claim 3, wherein said hazard checker is responsive to detecting that all of said marked outstanding transaction requests have completed to no longer compare transaction requests with outstanding transaction until receipt of a subsequent barrier transaction request.

5. Interconnect circuitry according to claim 3, wherein said interconnect comprises two routes between two points in said interconnect circuitry, a first of said two routes transmitting transaction requests faster than a second of said two routes, said second of said two routes comprising said hazard checker for checking a stream of transaction requests passing along said second of said two routes, said control circuitry being responsive to detecting that all of said marked transaction requests have completed to route said stream of transaction requests via said first route.

6. Interconnect circuitry according to claim 1, wherein said hazard checker comprises a data store for storing data identifying said outstanding transaction requests and an indicator associated with each outstanding transaction request, and said hazard checker is responsive to detection of a barrier transaction request within said stream of transaction requests to mark all of said outstanding transaction requests by setting said indicator for all of said outstanding transaction requests and to only compare subsequent transaction requests with marked outstanding transaction requests.

7. Interconnect circuitry according to claim 1, wherein said hazard checker comprises a comparator for comparing at least a portion of an address of said transaction request with a corresponding portion of an address of said outstanding transaction requests and in response to a match detecting said potential data hazard.

8. A method of routing transaction requests from at least one initiator device to at least one recipient device via interconnect circuitry, said method comprising the steps of:

receiving transaction requests from said at least one initiator device;

routing said transaction requests along at least one path between at least one input to said interconnect circuitry and at least one output;

maintaining an ordering of at least some transaction requests with respect to barrier transaction requests within a stream of transaction requests passing along one of said at least one paths, by not allowing reordering of at least some of said transactions requests that occur before said barrier transaction request in said stream of transaction requests with respect to at least some of said transaction requests that occur after said barrier transaction request in said stream of transaction requests;

detecting transaction requests within said stream of transaction requests: and in response to detecting that said transaction request is a barrier transaction request, terminating said barrier transaction request;

in response to said detecting that said transaction request is not a barrier transaction request, comparing said transaction request against outstanding transaction requests that have not yet completed and are in front of said transaction request in said stream of transaction requests, and determining if said transaction request may potentially generate a data hazard; and only in response to detecting a potential hazard between said transaction request and at least one of said outstanding transaction requests, stalling said transaction request until said at least one outstanding transaction request has completed.

9. Method according to claim 8, comprising a further step in response to said transaction request being a barrier transaction request of transmitting a response signal to a source of said barrier transaction request.

10. Method according to claim 8, comprising a further step of in response to detection of said barrier transaction request within said stream of transaction requests marking all of said outstanding transaction requests and only comparing subsequent transaction requests with marked outstanding transaction requests.

11. Method according to claim 10, in response to detecting that all of said marked outstanding transaction requests have completed not comparing transaction requests with outstanding transaction until receipt of a subsequent barrier transaction request.

12. Method according to claim 10, in response to detecting that all of said marked transaction requests have completed routing said transaction requests along a path not comprising said hazard checker.

13. Method according to claim 8, comprising a further step of storing data identifying said outstanding transaction requests and an indicator associated with each stored outstanding transaction request, and in response to detecting a barrier transaction request within said stream of transaction requests marking all of said outstanding transaction requests by setting said indicator for all of said outstanding transaction requests and only comparing subsequent transaction requests with marked outstanding transaction requests.

14. Method according to claim 8, wherein said comparing step comprises comparing at least a portion of an address of said transaction request with a corresponding portion of an address of said outstanding transaction requests and in response to a match detecting said potential data hazard.

15. Interconnect means for providing data routes viaby which at least one initiator device may access at least one recipient device within a data processing apparatus, said interconnect means comprising:

at least one input means for receiving transaction requests from said at least one initiator device;

at least one output means for outputting said transaction requests to said at least one recipient device;

at least one routing means for transmitting said transaction requests between said at least one input means and said at least one output means;

control means for routing said received transaction requests from said at least one input means to said at least one output means, wherein said control means, in addition is for maintaining an ordering of at least some transaction requests with respect to said barrier transaction request within a stream of transaction requests passing along one of said at least one routing means, by not allowing reordering of at least some of said transactions requests that occur before said barrier transaction request in said stream of transaction requests with respect to at least some of said transaction requests that occur after said barrier transaction request in said stream of transaction requests;

hazard checking means for checking a stream of transaction requests and comparing a transaction request within said stream of transaction requests against earlier outstanding transaction requests that have not yet completed, to determine if said transaction request may potentially generate a data hazard, and in response to detecting a potential hazard between said transaction request and at least one of said outstanding transaction requests said hazard checking means, is configured to stall said transaction request until said at least one outstanding transaction request has completed; and barrier termination means, associated with said hazard checking means, for detecting a barrier transaction request within said stream of transaction requests and, only in response to said detecting, terminating said barrier transaction request.

* * * * *